Aug. 30, 1966  T. UNSWORTH  3,270,249
MULTI-POLE TRAILER SOCKET
Filed May 21, 1964
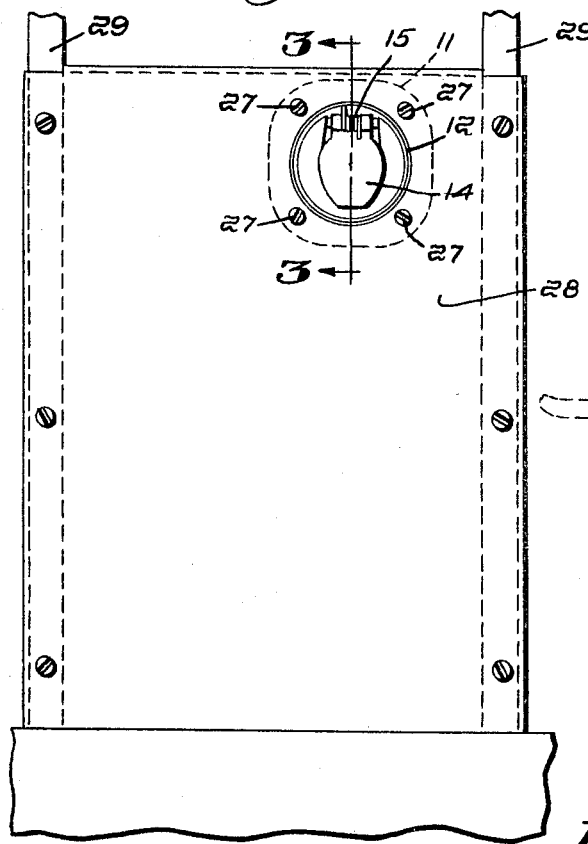
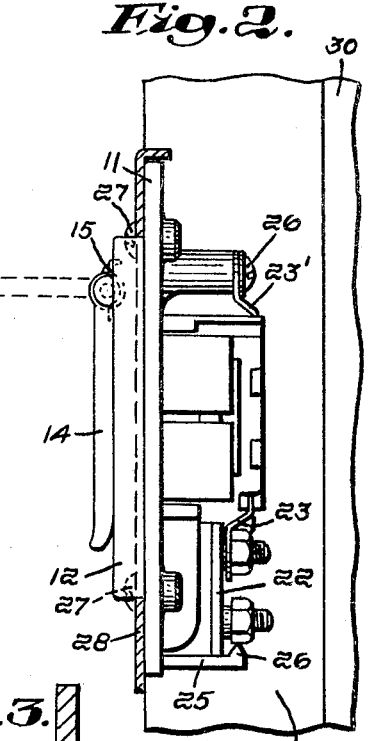
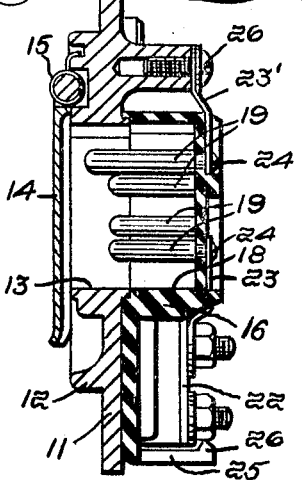
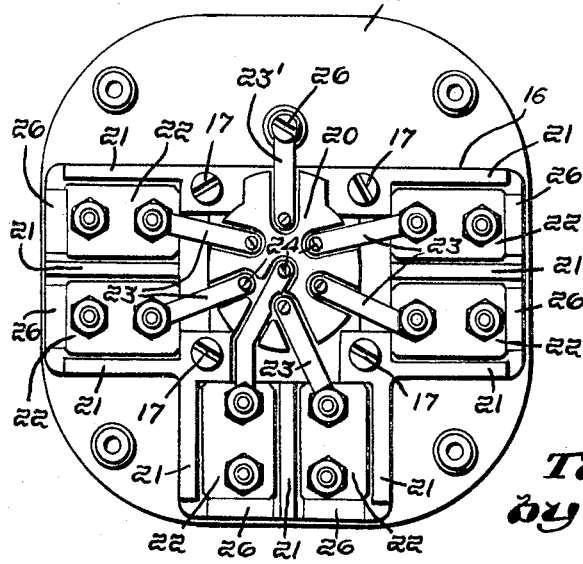
Inventor:
Thomas Unsworth,
by Arthur D. Thomson
Attorney "# United States Patent Office 3,270,249
Patented August 30, 1966

3,270,249
MULTI-POLE TRAILER SOCKET
Thomas Unsworth, Wellesley, Mass., assignor to Cole-Hersee Company, South Boston, Mass., a corporation of Massachusetts
Filed May 21, 1964, Ser. No. 369,150
3 Claims. (Cl. 317—99)

This invention relates to improvements in multi-pole trailer sockets serving as connectors for an electric cable leading from the power source of a tractor to a trailer-truck for supplying current to the lighting system of the trailer.

The principal purposes of the invention is to provide a trailer socket which is compact in size so that it may be mounted in a relatively small space on the front of the trailer; which incorporates a plurality of circuit breakers so connected to the respective poles of the socket as to ensure better electrical connections and easier serviceability, with reduced cost, as compared with previous installations in which circuit breakers have been mounted separately and wired to the socket or connector; and which is so mounted that it may be quickly and easily attached and replaced and affords protection against the elements.

These and other advantages of the improved trailer socket will become apparent from the following description of the recommended embodiment of the invention illustrated on the accompanying drawing. It will be understood, however, that the structural details of the socket herein illustrated and described may be varied to suit particular conditions or requirements without departing from the essence of the invention as set forth in the appended claims.

In the drawings,

FIG. 1 is a front elevation of the improved socket as mounted on a panel attached to the front wall of a trailer;

FIG. 2 is a side elevation, looking to the left of FIG. 1, the mounting panel being shown in fragmentary section;

FIG. 3 is a section of the improved socket, taken on line 3—3 of FIG. 1; and

FIG. 4 is a rear elevation of the improved socket.

In the form chosen for the purpose of illustration, the improved socket is a 7-pole connector adapted to receive the plug of a conventional current-carrying cable (not shown) having seven circuit wires, but the number of circuits and the number of socket poles may be more or less than seven.

The socket comprises a base plate 11 having a circular flange having a circular projecting rim 12 on its front side, substantially concentric with a circular opening 13 for receiving the cable plug, and having a cover 14 hinged to the rim and normally urged to closed position over the opening 13 by a coiled spring 15 at the hinge.

A block 16 of insulating material is attached by screws 17, or otherwise, to the rearward side of the metal base plate 11, and the block has a central circular recess 18 substantially corresponding in diameter to the diameter of the plate opening 13. The poles or conductor prongs 19 of the socket are fastened by screws, or otherwise, in the recess 18 and project forwardly into the plate opening. The recess 18 is formed in a substantially circular boss 20 at the center of the insulating block.

The back of the insulating block 16 is formed with integral ridges 21 defining shallow cavities which receive standard bi-metallic, self-restoring circuit breakers 22, each carrying a pair of terminals. The inner terminal of each pair is connected by a rigid bus bar conductor 23 to each of the poles 19, as by the pole-retaining screws 24 or other mounting means therefor, thereby affording a superior electrical connection between the respective poles and the respective circuit breakers. The circuit breakers are removably retained in their respective cavities by upstanding fingers 25 having hooked ends 26 which overhang the outer ends of the circuit breakers. The fingers 24 may be molded integrally with the insulating block, or suitably attached thereto. In either case they should be formed of plastic or other insulating material.

As shown, one of the bus bars, 23', is connected to a ground terminal 26, forming part of the base plate 11, rather than to a circuit breaker.

The trailer socket is mounted by fastening its margin, as by screws 27, to the rear surface of a mounting plate or panel 28 which, in turn, is screwed to spaced battens 29 projecting outwardly from the front wall 30 of the trailer-truck body, as shown in FIGS. 1 and 2. Panel 28 has an opening receiving the upstanding circular rim 12 on the front side of the socket. The compact size of the improved socket permits it to be installed between the panel 28 and wall 30, which are normally spaced about 2 inches; the socket may be quickly and easily installed in that position, and may readily be removed for replacement when necessary; and the location of the back portion of the socket behind the panel 28 tends to protect the electrical components of the socket against adverse weather conditions.

A trailer socket constructed as above described thus satisfies the objectives of this invention in a simple and economical manner. It will be understood that the outer terminals of each circuit breaker would be wired to the respective lighting circuits of the trailer-truck in the usual manner.

I claim:

1. A trailer socket of the type described, comprising a base plate having an insulating block secured to the rear side thereof, the plate having a generally circular opening therethrough and the block having a generally circular boss with a recess for receiving a cable plug carrying a plurality of electric circuits, said recess being concentrically aligned with said opening, pole-like conductors mounted in said recess and adapted to be engaged by said cable plug, a plurality of circuit breakers removably mounted on the rear of said block and disposed around said boss, and bar conductors connecting said circuit breakers to the respective pole-like conductors.

2. A trailer socket as described in claim 1, said block having cavities receiving the respective circuit breakers, and having upstanding fingers formed with hooked outer ends overhanging one of the ends of the respective circuit breakers disposed in said cavities, the other ends of said circuit breakers being secured to said bar conductors.

3. A trailer socket as described in claim 1, said base plate having on its front side a projecting rim concentric with said opening and a spring-pressed cover normally closing said opening, a mounting plate having an opening receiving said rim, and means removably securing the base plate to the mounting plate, whereby the mounting plate may be attached to a trailer wall with the base plate and insulating block disposed behind the mounting plate.

(References on following page)"

References Cited by the Examiner

UNITED STATES PATENTS

| | | | |
|---|---|---|---|
| Re. 18,193 | 9/1931 | Kollath | 200—115.5 |
| 2,201,344 | 5/1940 | Paulson | 317—99 X |
| 2,256,537 | 9/1941 | Wulle | 200—115.5 |
| 2,797,337 | 6/1957 | Hollis | 200—51 X |
| 3,189,212 | 6/1965 | Bellek | 339—44 X |

FOREIGN PATENTS 549,859  5/1932  Germany.

ROBERT K. SCHAEFER, *Primary Examiner.*

ROBERT S. MACON, *Examiner.*

W. C. GARVERT, *Assistant Examiner.*